US010882994B2

(12) United States Patent
Huh

(10) Patent No.: US 10,882,994 B2
(45) Date of Patent: Jan. 5, 2021

(54) HIGHLY VISCO-ELASTIC WARM-MIX MODIFIER COMPOSITION AND THEIR MANUFACTURING METHOD THEREOF; AND COMPOSITIONS OF VIRGIN AND RECYCLED MODIFIED WARM-MIX ASPHALT CONCRETE MIXTURES AND THEIR MANUFACTURING METHOD THEREOF

(71) Applicant: Jung Do Huh, West Jordan, UT (US)

(72) Inventor: Jung Do Huh, West Jordan, UT (US)

(*) Notice: Subject to any disclaimer, the term of this patent is extended or adjusted under 35 U.S.C. 154(b) by 0 days.

(21) Appl. No.: 14/764,958

(22) PCT Filed: Jan. 29, 2014

(86) PCT No.: PCT/KR2014/000838
§ 371 (c)(1),
(2) Date: Jul. 30, 2015

(87) PCT Pub. No.: WO2014/129758
PCT Pub. Date: Aug. 28, 2014

(65) Prior Publication Data
US 2015/0368470 A1 Dec. 24, 2015

(30) Foreign Application Priority Data
Feb. 19, 2013 (KR) ........................ 10-2013-0017284

(51) Int. Cl.
*C08L 95/00* (2006.01)
*C08L 21/00* (2006.01)
(Continued)

(52) U.S. Cl.
CPC ................ *C08L 95/00* (2013.01); *C08K 3/34* (2013.01); *C08L 21/00* (2013.01); *C08L 23/04* (2013.01);
(Continued)

(58) Field of Classification Search
CPC .......... C08L 95/00; C08L 21/00; C08L 77/06; C08L 23/04; C08L 2555/34;
(Continued)

(56) References Cited

U.S. PATENT DOCUMENTS

2012/0167802 A1* 7/2012 Huh ........................ C04B 26/26
106/669

FOREIGN PATENT DOCUMENTS

CN 102250287 A * 11/2011
JP 2003165900 A * 6/2003
(Continued)

OTHER PUBLICATIONS

WO 2011027926 A1, machine translation, Google Patents. (Year: 2011).*

(Continued)

*Primary Examiner* — Josephine L Chang
(74) *Attorney, Agent, or Firm* — Maschoff Brennan; Jonathan M. Benns

(57) ABSTRACT

The first priority of this invention is to provide the composition and the manufacturing method of a novel highly visco-elastic warm-mix modifier that can be added to asphalt binders for the purpose of reducing environmental pollution, saving natural resources by recycling RAP aggregates, reducing construction cost, and minimizing maintenance cost by extending pavement life-cycle. The highly visco-elastic warm-mix modifier may be manufactured by adding highly viscous and general purpose polymers to elastic polymers in the warm mix modifier. Warm mix additives, including waxes, oils and elastic materials, may also be introduced to the highly visco-elastic warm-mix modifier. In more details, the invention is characterized to manufacture the novel modified recycled (or regular) warm-mix asphalt
(Continued)

concrete mixture by heating and mixing 0.5-20 weight parts of the highly visco-elastic warm-mix modifier.

12 Claims, 5 Drawing Sheets

(51) Int. Cl.
 *C08L 77/06* (2006.01)
 *C08L 23/04* (2006.01)
 *C08K 3/34* (2006.01)
 *E01C 7/18* (2006.01)

(52) U.S. Cl.
 CPC ........... *C08L 77/06* (2013.01); *C08L 2555/24* (2013.01); *C08L 2555/34* (2013.01); *C08L 2555/60* (2013.01); *E01C 7/18* (2013.01); *Y02A 30/30* (2018.01); *Y02P 20/582* (2015.11)

(58) Field of Classification Search
 CPC ... C08L 2555/24; C08L 2555/60; C08K 3/34; Y02P 20/582; E01C 7/18; Y02A 30/333
 USPC .................................................. 524/71, 514
 See application file for complete search history.

(56) References Cited

FOREIGN PATENT DOCUMENTS

| KR | 1020010040101 | 1/2003 | |
|---|---|---|---|
| KR | 1004172940000 | 2/2004 | |
| KR | 1004228960000 | 3/2004 | |
| KR | 1004358480000 | 6/2004 | |
| KR | 1020050076461 | 9/2005 | |
| KR | 1020040032869 | 11/2005 | |
| KR | 1005669570000 | 3/2006 | |
| KR | 1006062910000 | 8/2006 | |
| KR | 1006690790000 | 1/2007 | |
| KR | 1007000780000 | 3/2007 | |
| KR | 1007801770000 | 11/2007 | |
| KR | 1008233520000 | 4/2008 | |
| KR | 1020080055510 | 12/2009 | |
| KR | 1010234250000 | 3/2011 | |
| KR | 1020090083749 | 3/2011 | |
| KR | 1020110026038 A | 3/2011 | |
| KR | 1010476000000 | 7/2011 | |
| KR | 1003097980000 | 12/2011 | |
| KR | 1011245840000 B1 | 2/2012 | |
| KR | 1011245840000 | 3/2012 | |
| KR | 1011661550000 | 7/2012 | |
| KR | 1020100135322 | 7/2012 | |
| WO | WO-2006107179 A2 * | 10/2006 | .............. C08L 95/00 |
| WO | WO-2011027926 A1 * | 3/2011 | .............. C04B 26/26 |

OTHER PUBLICATIONS

CN 102250287 A, machine translation, EPO Espacenet Patent Translate. (Year: 2011).*
JP 2003-165900 A, machine translation, EPO Espacenet. (Year: 2003).*
Flick, E.W., "Initiators," Table, Plastics Additives Database, William Andrew Publishing. (Year: 2004).*
WO 2011/027926 A1, machine translation, ip.com. (Year: 2011).*
Dr. John Read & David Whiteoak, The Shell Bitumen Handbook, 2003, Thomas Telford Publishing, London, GB, pp. 35-36.
Jiqing Zhu, Polymer Modification of Bitumen: Advances and Challenges, European Polymer Journal, 2014, p. 15.
Mural Hidayah, What are the Types of Modifier in Bitumen?, Highway Engineering, 2008.

* cited by examiner

[Figure 1]
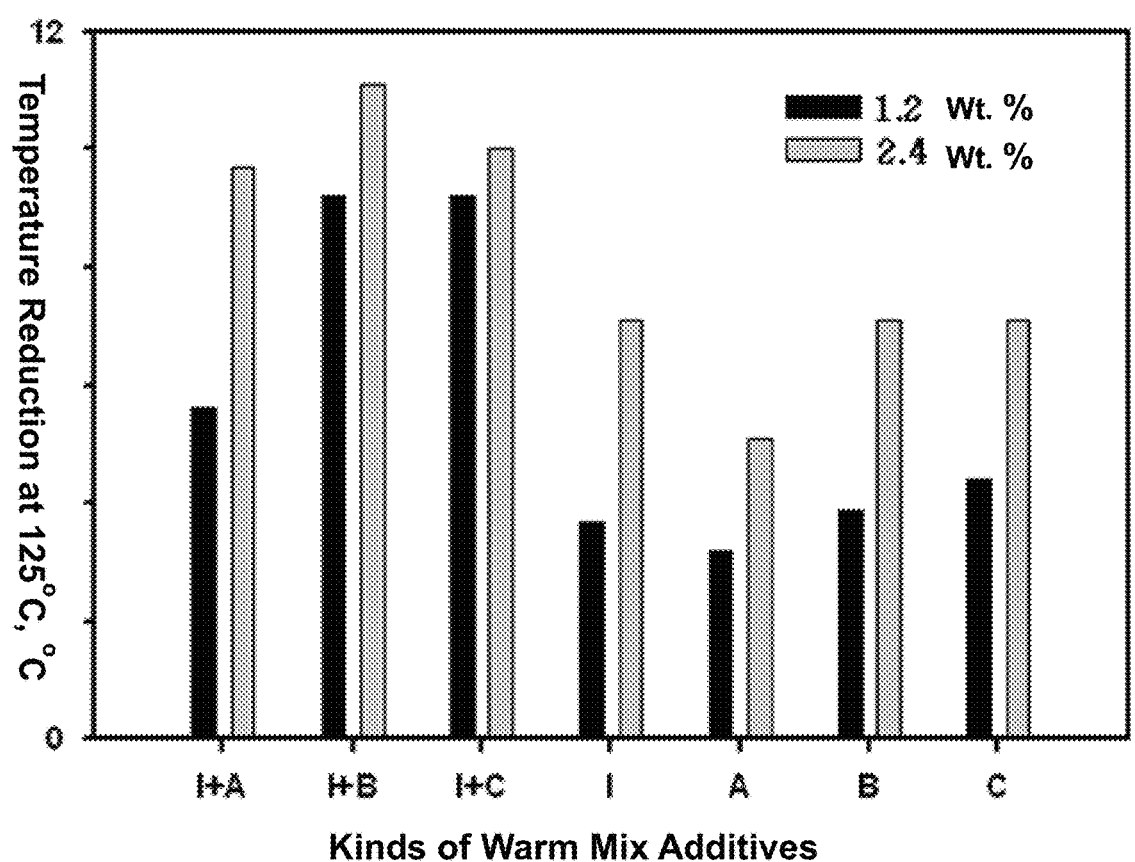

[Figure 2]
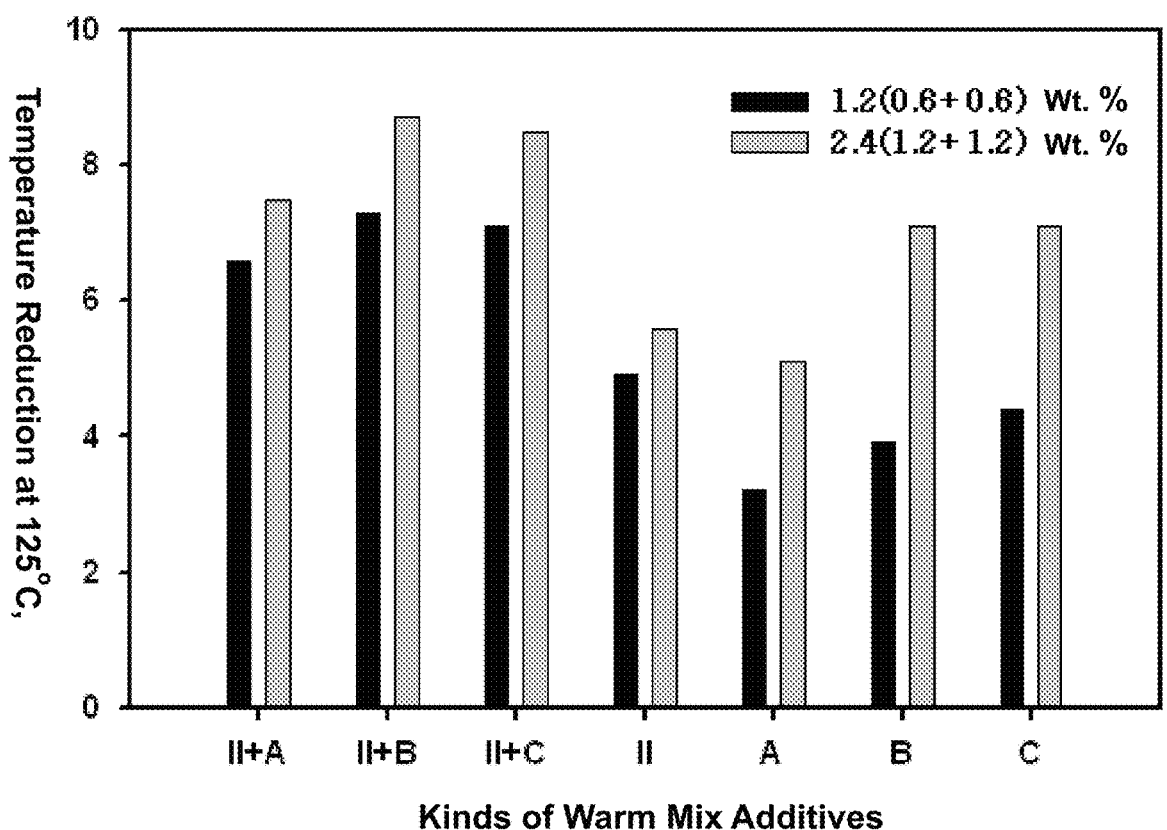

[Figure 3]
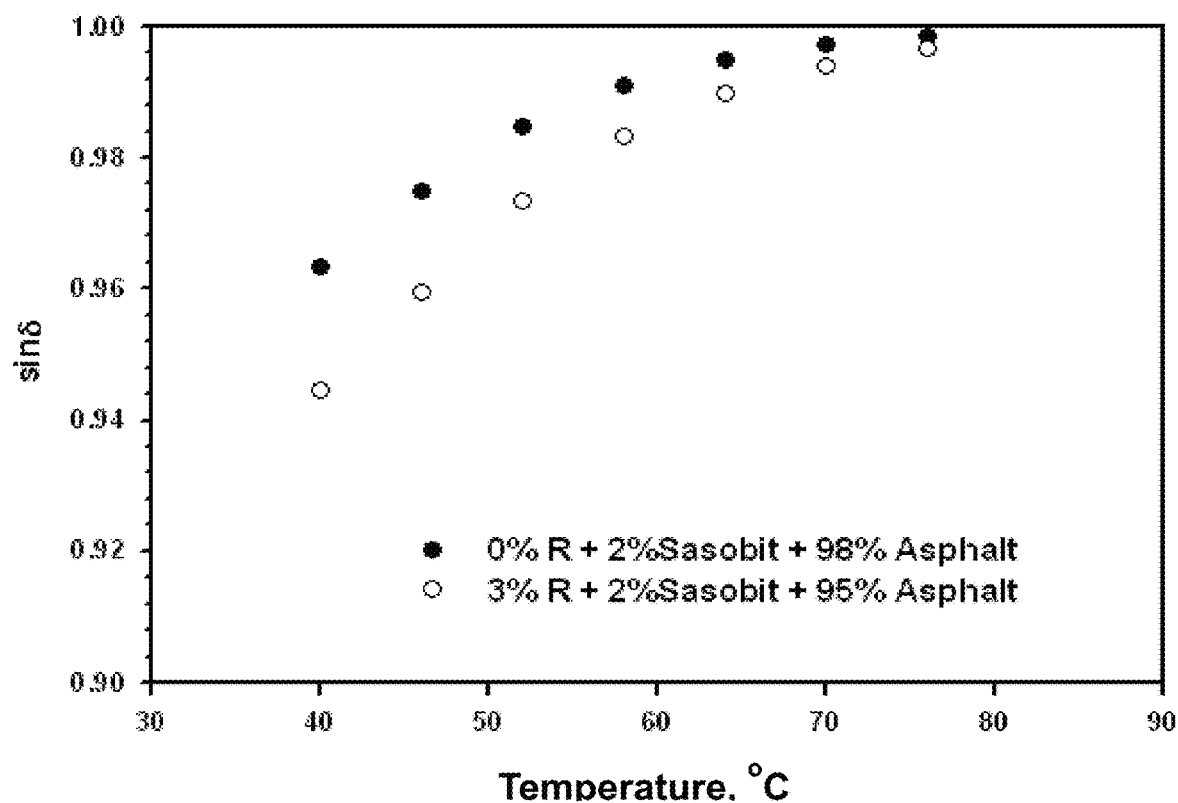

[Figure 4]
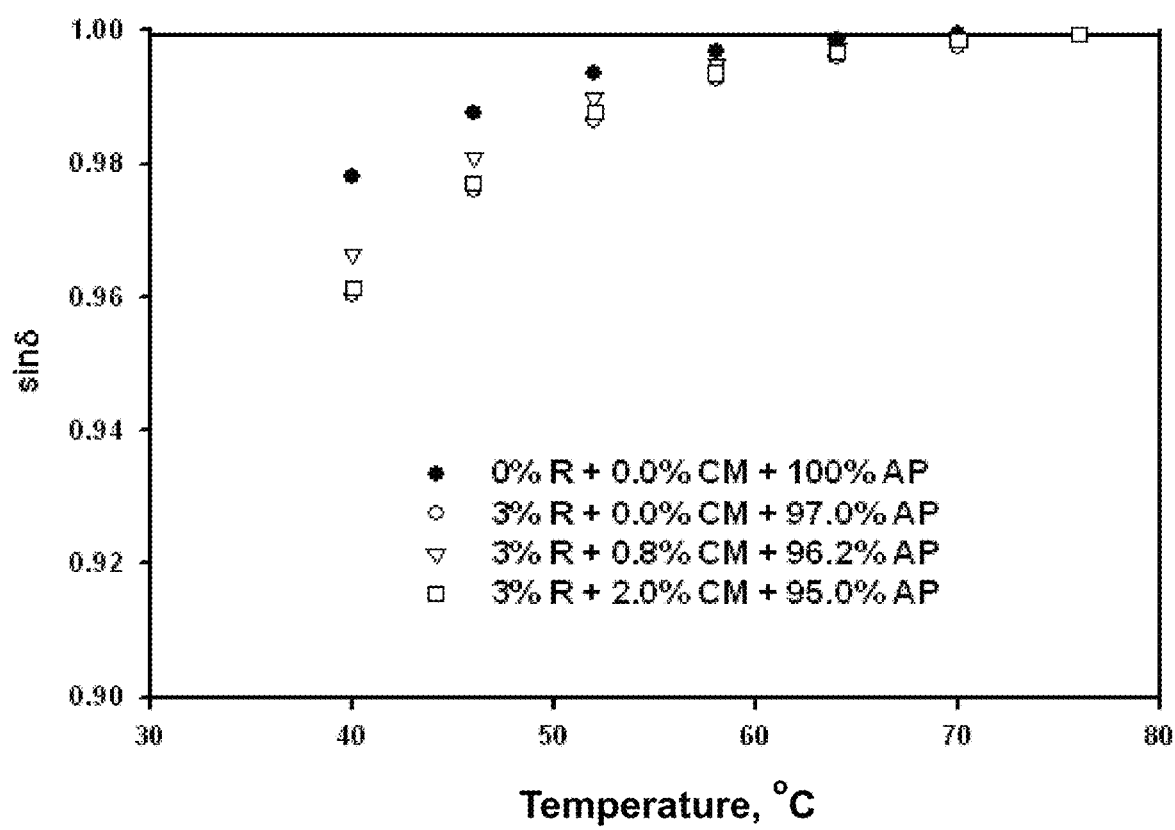

[Figure 5]
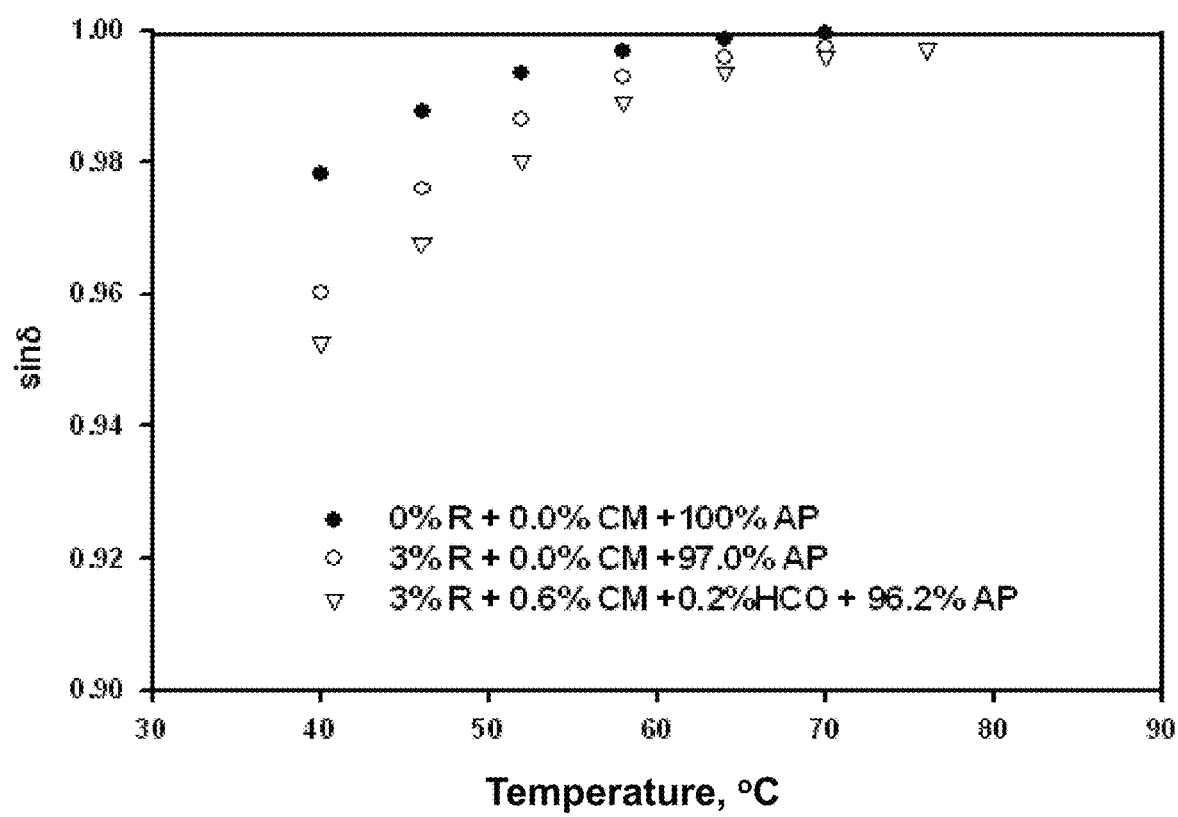

HIGHLY VISCO-ELASTIC WARM-MIX MODIFIER COMPOSITION AND THEIR MANUFACTURING METHOD THEREOF; AND COMPOSITIONS OF VIRGIN AND RECYCLED MODIFIED WARM-MIX ASPHALT CONCRETE MIXTURES AND THEIR MANUFACTURING METHOD THEREOF

TECHNICAL FIELD AND TRADITIONAL TECHNOLOGY BELONGING TO INVENTION

Roadways are social intra-structure and take charge of most transportation of people and goods. More than 80% of worldwide roads are paved with asphalt pavements, and most of heavy traffic loadings are absorbed into the asphalt pavement layer. Repeated heavy traffic loading and impact making pavement life cycle shortened result to easy pavement damage, or asphalt pavements experience another early damage due to bad pavement construction practice.

In repairing or maintaining damaged pavements, several billion dollars of national budgets are spent each year. If life cycle of asphalt pavements can be extended more, tremendous construction budget can be saved. Asphalt pavements are constructed by paving asphalt concrete mixtures (produced from mixing an asphalt binder, aggregates and fillers at a high temperature) on the roadbed in the order of a base, an intermediate, and a surface layer from bottom to top and then each paved layer is compacted by rollers to finish construction. The important raw materials determining pavement quality is both asphalt binders and aggregates under the assumption of construction well done. However, aggregate size and gradation cannot be a critical factor due to using almost identical ones, but asphalt binders can affect greatly the pavement quality due to many modifications to be made.

Asphalt binders showing comparatively less molecular weight inherently possess considerably inferior physical properties compared to polymers having a high molecular weight. Thus, by using polymer resins possessing excellent physical properties, the inferior properties of asphalt binders can be improved in order to extend life cycle of pavements. The polymer additive to be used for this purpose is called the modifier, and the asphalt binder containing the modifier is called the modified asphalt binder. However, note that, according to kinds of modifiers used, there exist a lot of differences in physical property improvement of asphalt binder. In producing modified asphalt concrete mixtures (modified ASCON) by adding modifiers or modified asphalt binders, either high heating (160-170° C., hot mix asphalt) or medium heating (120-140° C., warm mix asphalt) production method exists. The latter method (the warm mix asphalt production method) is favored in the view of reduction of environmental pollution and saving of energy. In addition, production of RAP (Reclaimed Asphalt Pavement)) recycled hot mix asphalt mixing with some virgin materials are recently in the increasing trend to prevent land pollution and to save construction cost. This invention belongs to the technology area of the modified, RAP-recycled (or virgin) warm mix asphalt production including all technologies mentioned above.

BACKGROUND TECHNOLOGY

Generally, performance properties of asphalt pavements respond sensitively on magnitude of traffic loading and seasonal temperature variation such that both effects often cause rutting and fatigue cracking of asphalt pavements. That is, under heavy traffic loading, asphalt pavements experience various cracks at low temperatures (at less than −10° C.) due to increase of stiffness caused by material contraction. Meanwhile, rutting takes place due to shear flow of materials caused by weakened pavement viscosity at high temperatures (higher than 50° C.). Generally modern economic expansion makes number of automobiles, traffic volume and heavily loaded trucks increased such that pavement problems mentioned above become accelerated and life cycle of existing pavements is drastically shortened. Therefore, major roadways commonly use modified asphalt pavements instead of regular ones to prevent decrease of pavement life cycle. A modifier can be included as a key material element in constructing modified asphalt pavements. The modifier can be constituted from a single polymer (i.e., styrene-butadiene-styrene (SBS), low density polyethylene (LDPE), etc.), but is usually composed of both elastic materials (to resist cracks in the cold winter) and viscous materials (to minimize rutting in the hot summer).

Let's review the previous technologies about polymer modifiers. In Korean patent 2002-034496, gilsonite as a viscosity thickening agent and styrene-butadiene-styrene (SBS) as an elasticity enforcing agent, and in Korean patent 2003-004579, gilsonite as a viscosity thickening agent, crumb rubber as an elasticity enforcing agent, and in Korean patent 10-0669079, asphaltite powder and polyethylene (PE) powder as viscosity thickening agents and crumb rubber as an elasticity enforcing agent, respectively, are used as compositions. Gilsonite (a highly viscous liquid) and asphaltite (solid powder) are naturally produced at the northeastern corner of Utah State in USA. Both containing asphaltenes as a major element are characterized to be rigid and strongly stiffened. These materials have disadvantage of producing early pavement cracks due to strong stiffness. Hence, gilsonite as a viscosity thickening agent claimed in 2002-034496 and 2003-004579 cannot be a desirable agent in the view of pavement performance properties compared to better different viscosity thickening agents available. In Korean patent 10-2007-0669079, to resolve the above brittle problem, Polyethylene (PE, a general purpose resin) is included together. If more PE are added, brittleness is lessened, but lack of binder adhesion on aggregates is resulted due to no functional groups present in the PE molecule that promotes adhesion.

In Korean patent 10-2003-005537, epoxy resin and petroleum resin as viscosity thickening agents, and SBS and rubber as elasticity enforcing agents, and in Korean patent 10-2003-0069911, petroleum resin as a viscosity thickening agent, SBS and rubber as elasticity enforcing agents, respectively, are used as compositions. Here, too, because epoxy and petroleum resin have disadvantage of producing early pavement cracks due to strong brittleness, the modifier including those compounds cannot be a good agent. In addition, the epoxy resin is economically expensive.

In Korean patent 10-2005-0076461, waste PE film as a viscosity thickening agent is only used without an elasticity enforcing agent. Even though waste PE film is inexpensive, it is not a good modifier as explained above, and cold winter can cause easy cracks on pavements due to no elasticity present.

In Korean patent 10-2001-0037903, aromatic petroleum resin as a viscosity thickening agent, and SBS and rubber as elasticity enforcing agents, and additionally aromatic processing oil and antioxidant are added together as compositions. Even here, petroleum resin as a viscosity thickening agent is not desirable due to strong brittleness.

In Korean patent 10-2006-0122508, high density polyethylene (HDPE) as a viscosity thickening agent, and crumb rubber as an elasticity-enforcing agent are used as compositions. Because HDPE is a partially crystalline polymer, crystallization formed at low temperatures increases stiffness to make early pavement cracks, and also no functional groups present in the HDPE molecule make poor adhesion on aggregates. Above all, HDPE does not have good compatibility with crumb rubber used. All these suggest that the compositions mentioned above will produce an inferior modifier.

In conclusion, among traditional compositions of modifiers, most of polymer resins used as a viscosity thickening agent are general resins with common viscosity (i.e., waste PE, HDPE, low density polyethylene (LDPE), Ethylene vinyl acetate (EVA), etc.), not high viscosity. If the regular amount of those polymers is added in making modified asphalt binder, enough viscosity building fails. This brings relatively easy rutting. In the contrary, with the large amount added, a cost problem will be added. Furthermore, polymers that can acquire high enough viscosity at elevated temperatures (i.e., gilsonte, asphaltite, petroleum resin, epoxy resin, etc.) can be brittle at low temperatures resulting to easy pavement cracks.

Recently, the warm mix asphalt (WMA) production instead of the hot mix asphalt (HMA) receives more attention in attempt to resolving the fuel consumption and the air pollution problem of HMA production, and many patents are issued about it. In Korean patent 10-2012-0073529, maleic-polyethylene wax and processing oil as a warm-mix additive, and SBS or styrene-butadiene-rubber (SBR) as a modifier are used. However, SBS or SBR is a weakly viscous and elastic polymer. And thus it will scarcely causes pavement cracks, but has more probability of making rutting due to the weak viscosity.

The Korean patent 10-0823352 suggests a processing wax by Fisher-Tropsh method (called a sasobit wax) as a warm mix additive, amine or lime soda as an anti-stripping agent, and an ethylene-vinyl acetate (EVA) copolymer and an inorganic powder as modifiers. However, the EVA resin is not considered as a proper modifier because it shows relatively soft viscosity and is not elastic either at low temperatures. The Sasobit wax as a warm mix additive also helps to make brittleness at low temperatures (cracks) and softening at high temperatures (rutting).

The Korean patent 10-1166155 claims a warm mix additive by choosing more than one among processing oil, plasticizer, linseed oil, bean oil and rice oil, and, a modifier by choosing polyurethane (PU) polymerized by reacting with polyols (or polyamines) and isocyanate under catalysts (cobalt type, lead type, phosphorous type). But it has failed to provide polymerization degree in the reaction and physical properties of polymerized polyurethane (PU) whether it can be used as a modifier or not.

The Korean patent 10-1023425 uses more than one among processing oil, petroleum resin and sasobit wax as a warm mix additive, and SBS or water-dispersed acrylic emulsion as a modifier. However, total viscosity of modified asphalt viscosity is still low such that it is expected for the modified binder likely to face rutting problem.

In Korean patent 10-1023425, use of more than one among rosin, polyethylene (PE), Bunker-C oil and asphalt binder as a warm mix additive, and a mixture of EVA and more than one of SBS, styrene-isoprene-styrene (SIS), LDPE, HDPE, PU chip, ethylene-propylene-diem (EPDM) chip as a modifier are claimed to be used. This patent also shows good crack resistance as using elastic materials like SBS, SIS, PU chip, EPDM chip, but possibility of the pavement rutting problem cannot be avoided due to using EVA, LDPE, or HDPE as a viscosity building polymer that belongs to a weakly viscous general purpose resin. Even though HDPE has a relatively high viscosity leading to better rut resistance, it is a nonpolar (adhesion problem on aggregates) and crystalline (easy crack at low temperature due to contraction) polymer. Small amount failing to increase viscosity should be used.

According to the above patent literature survey, most of patents suggest use of a single or more than one as a warm mix additive. And most of modifiers used are characterized either good elastic property with low viscosity or highly brittle viscosity with low elasticity. It is hardly found good elasticity with highly tough viscosity as a desirable modifier.

DETAILED DESCRIPTION OF INVENTION

Technical Problems

Most of polymers used for a viscosity thickening agent known as existing modifiers are not totally free from pavement rutting, because they are general purpose resins and have not possessed enough viscosity. Thus, they were attempts to thicken viscosity by using a rigid and stiff polymer found among general purpose resins. However, increased stiffness can cause early pavement cracks during the cold winter period. It is natural that many modifiers include elastic polymers to resist cracks at low temperatures, but most of them contain weak or even no viscous polymers as a viscosity thickening agent. For these modifiers, pavement rutting takes place easily due to weakened viscosity during hot summer. Thus, the subject of this invention is to claim what kinds of viscous polymers should be used together with elastic polymers for rut resistance in hot summer and crack resistance in cold winter.

Additional topic about the use of warm mix additive to provide warm mix effect to modified asphalt mixes is included in this invention. Instead of simply using a single or more than one warm mix additives, detailed information of what kinds of warm mix additives used and what is the best composition to be an effective additive becomes a major concern. In addition, compositions of asphalt concrete mixes and their manufacturing technologies by using newly suggested modifiers and warm mix additives are also disclosed in this invention.

More RAP (Reclaimed Asphalt Pavement; construction waste) recycling is an timely task to be resolved because of reduction of land pollution and construction cost, and saving of natural resources. The present RAP recycled pavements experience early pavement damages due to early performance problems (i.e., rutting, fatigue cracking, etc.). As the result, pavement life shortened is another immediate task to be resolved.

Methods of Problem Resolution

This invention provides methodology to solve the technical limitations mentioned above. That is, under consideration of environmental and economic advantages, production of WMA (100-140° C.) instead of HMA (150-180° C.) is interested. In order to improve limited pavement quality problems of general virgin (or recycled) WMA as well as modified virgin (or recycled) WMA, this invention is to provide new compositions and manufacturing methods of highly viscoelastic WMA modifiers that show excellent performance properties even in severe weather condition during hot summer and cold winter. Furthermore, it is to provide technical characteristics relating to compositions and manufacturing methods of modified virgin (or recycled) WMA by using new highly viscoelastic modifiers claimed here.

The modified virgin (or recycled) WMA by using the new highly viscoelastic warm mix modifier is constituted of 0.5-20 weight parts of a highly viscoelastic warm mix modifier, 10-80 weight parts of an asphalt binder, 850-987.5 weight parts of aggregates, 2-50 weight parts of a filler, small amount of an amine-type stripping agent and a little anti-oxidant. The material with the above composition is characterized to input into the mixer of asphalt plant heated at 80-180° C. and are mixed to make modified virgin (or recycled) WMA (or HMA).

The new highly viscoelastic warm mix modifier is the 100 weight percent sum of the less than 100 weight percent highly viscoelastic modifier and the less than 100 weight percent crack-resistant warm-mix additive and a small amount of a reaction agent (i.e., benzoyl peroxide, maleic anhydride, acetaldehyde, platinum catalyst, etc.). Here, the highly viscoelastic modifier indicates 100 weight percent sum of the 10-90 weight percent combined viscous polymers and the 10-90 weight percent highly elastic polymers. Generally, asphalt binders or modified asphalt binders have visco-elastic properties, but most of them show either strong viscosity with low elasticity or weak viscosity with high elasticity. Almost all polymers fail to show both strong viscosity and high elasticity at the same time. To acquire strong property of both in a single modifier, it is necessary to combine strongly viscous polymers to highly elastic polymers in a proper way.

In the above, strongly viscous polymers represent polymers possessing very strong viscosity compared to the general ones having medium viscosity. They are specified to be polyethylene-tere-phthalate (PET), polyester (or nylon), and these polymers which have been coated with thin aluminum film. However, if a strongly viscous polymer by itself as a modifier is mixed together with liquid asphalt binders at a high temperature, drastic viscosity difference between the two liquids can cause a dispersion problem in the final binders made. Thus, general purpose polymers, having medium viscosity, are desirable to be mixed together with strongly viscous polymers to have effective dispersion in asphalt binders even at high temperatures. Hence, this invention claims a combination of viscous polymers of at least one strongly viscous polymers and at least one general purpose polymers as a viscous polymer component. Here, the general purpose polymers represent low density polyethylene (LOPE), linear low density polyethylene (LLOPE), high density polyethylene (HOPE), polyvinyl-acetate (PVA), ethylene-vinyl-acetate copolymer (EVA), polybutene (PB), etc.

Furthermore, combined viscous polymers include an adhesion sheet (or film) joining together on the boundary between one of the strongly viscous polymer sheets (or films) and one of the general polymer sheets (or films), and these adhesion sheets coated further with thin aluminium film on one side. These joined sheets produce the same effect of mixing the strongly viscous polymers to the general viscous polymers.

The above combined viscous polymer sheets are widely used in the market as a packaging material to contain liquid medicine, cookie, liquid and solid food, liquid drink, etc.

Mixing of the combined viscous polymers together with the highly elastic polymers can constitute the highly viscoelastic modifiers that are capable of showing both strong viscosity and high elasticity. Here, the highly elastic polymers are characterized to include styrene-butadiene-styrene (SBS), styrene-butadiene rubber (SBR), SBR latex, styrene-isobutylene-styrene (SIS), styrene-ethylene-butadiene-styrene (SEBS), scrape tire powder (or crumb rubber), waste rubber powder, natural rubber powder, ethylene-propylene-diem (EPDM) powder, liquid natural rubber, methyl methacrylate (MMA) resin, polyurethane (PU) powder, etc.

In cold regions, pavement elastic property becomes important to prevent pavement contraction that can cause crack generation. Meanwhile, in hot regions, pavement viscous property becomes important to prevent softening of pavements that can cause rutting. Thus, to be safe from harsh weather conditions, the ratio of adding combined viscous polymers to highly elastic polymers should be properly adjusted according to regional weather condition. For this consideration, the range of using ratio of the two different characters of polymers should be flexibly changed to be the sum of 100% by adding 10-90% combined viscous polymers to 10-90% highly elastic polymers.

Production of hot mix asphalt (HMA) by using highly visco-elastic modifiers generates problems like harmful gas evolution, fuel waste, and accelerated oxidative aging of asphalt binders. However the warm mix asphalt (WMA) production can substantially reduce problems of HMA production due to decreased temperatures. For this purpose, highly viscoelastic warm mix modifiers instead of hot mix modifiers are manufactured by adding crack-resistant warm mix additives to highly viscoelastic modifiers. In the above, the composition of highly viscoelastic warm mix modifiers is claimed to be the 100 weight % sum of the following material elements; they are less than 100 weight % of highly viscoelastic modifiers, less than 100 weight % of crack-resistant warm mix additives and a small amount of reaction accelerators. Here, the 100 weight % implies to use only the corresponding material alone without any. However, the 100 weight % sum means addition of highly viscoelastic modifiers, crack-resistant warm mix additives and a small reaction agent all together to make the sum be 100%.

Now, let us investigate compositional characteristics of crack-resistant warm mix additives.

Generally, warm mix additives are agents that make mix production and pavement construction at reduced temperatures compared to the regular hot mix practice by lowering viscosity of asphalt binders. If patents of the warm mix additive are reviewed, most of them are found to claim either one or more than one additive. However, this patent claims first time to compose warm mix additives as combination of more than two additives to be used together. Such a claim is based on scientific experiments obtained from broad research execution about temperature reduction effect of warm mix additives.

In FIG. 1 below, a certain amount of a warm mix additive is uniformly melted in an asphalt binder at a medium temperature (130° C.) to make a test specimen. At a specified temperature, specimen viscosity is measured by using the Brookfield rotational viscometer. By analyzing the measured specimen viscosities to the asphalt binder viscosity, temperature reduction of each warm mix additive is evaluated and is shown in FIG. 1. Temperature reduction of each warm mix additive I (1.2 grams and 2.4 grams), A (1.2 grams and 2.4 grams), B (1.2 grams and 2.4 grams) & C (1.2 grams and 2.4 grams) melted in asphalt binders (98.8 grams and 97.6 grams) to make 100 grams of warm-mix asphalt binder specimens and those reductions by using two combination warm mix additives of I+A (0.6+0.6 grams and 1.2+1.2 grams), I+B (0.6+0.6 grams and 1.2+1.2 grams), I+C (0.6+

0.6 grams and 1.2+1.2 grams) melted in the same asphalt binders (98.8 grams and 97.6 grams) to make 100 grams are well demonstrated in FIG. 1.

As shown in FIG. 1, the 1.2-gram and the 2.4-gram case for the single warm mix additives (I, A, B & C) show the average 3.7° C., and 7.1° C. temperature reduction, respectively, while the two combination warm mix additive cases of (0.6+0.6)-gram and the (1.2+1.2)-gram for I+A, I+B, & I+C demonstrate the average 8.0° C. (2.2-time increase), and 10.3° C. (1.45-time increase) temperature reduction, respectively. This result confirms that combination of two additives instead of single additives under using the identical amount is further effective in reducing production temperature.

By following the same experimental procedures in getting the data of FIG. 1, the temperature reduction of different warm mix additives such as II, A, B, C and their two combinations are measured and exhibited in FIG. 2. As shown in FIG. 2, single additives (II, A, B, C) used as 1.2-gram to make 100 grams of an warm mix asphalt binder have shown the average of 4.1° C. reduction compared simply to 100 grams of an asphalt binder alone, and the average of 6.4° C. reduction for the case of 2.4-gram addition. Meanwhile, combination of two additives (II+A, II+B, II+C) has shown the average of 7° C. temperature reduction for 1.2 (0.6+0.6) gram case (about 1.7 times increase compared to the single additive case) and the average of 8.2° C. reduction for 2.4 (1.2+1.2) gram case (about 1.3 times increase compared to the single additive case). Hence, FIG. 2 obtains the identical conclusion of FIG. 1; that is, using combination of two warm mix additives shows better temperature reduction effect than using single additives under the same amount of additives used. Thus, this invention claims that combination of more than 2-additives must be used to get better warm mix effect instead of using single additives.

As claimed in the above, the warm mix additive of this invention is characterized to include the combination of more than two among all solid warm mix additives, the combination of more than two among all liquid warm mix additives, the combination of more than one in solid additives and more than one in liquid additives, and the rate of each combination is determined arbitrary.

In the above, the solid warm mix additive is characterized to include 12-hydroxy stearic acid, hydrogenated castor oil, Sasobit wax, petroleum resin, cumaron resin, pine resin, ethylene-vinyl-acetate (EVA) wax, polyethylene wax, polyamide wax, maleic-polyethylene wax and all other solid warm mix additives not mentioned here.

In the above, the liquid warm mix additive is characterized to include liquid evotherm, polyalkaneamer, ethylene-vinyl-acetate (EVA) emulsion, acryl emulsion, styrene-butadiene-rubber (SBR) emulsion, aromatic process oil, aliphatic process oil, mixed processing oil of aromatic and aliphatic oils, cutback asphalt, heavy oils, A, B & C bunker oil, asphalt emulsion, industrial oils (automobile engine oil, lubricant, compressor oil, ship engine oil), plant oils (palm oil, coconut oil, linseed oil, soybean oil, other bean oils, perilla oil, castor oil), animal oils (cow oil, pig oil, fish oil), various surface-active agents, various plasticizers, and all other liquid warm mix additive not mentioned here.

Warm mix additives are widely used, but crack-resistant warm mix additives may be unfamiliar because they are introduced first time in this invention. Wax-type additives that usually show a melting point at 80-120° C. are often used as a warm mix additive. These waxes take a role of warm mix additives by drastically decreasing their viscosities above their melting points and by increasing their hardness below their melting points. Hardening by waxes below the melting point contributes to overall material stiffening that has a positive effect of traffic loading supporter on pavements, but has negative effect of local crack evolution that are eventually leading to large pavement cracks. This is mainly due to hardening effect of the wax-type warm mix additive. To avoid this negative effect as well as to enhance crack resistance, a small amount of elastic material can be added to warm mix additives. This additive is called a crack-resistant warm mix additive that contributes to reducing pavement cracks at low temperatures.

The crack-resistant warm mix additive of this invention consists of 100 weight percent (wt. %) sum of 20-100 wt. % of warm mix additive and less than 80 wt % of the elastic material. The minimum of 20 wt. % warm mix additive indicates the least amount of the warm mix additive to produce warm mix effect, and the maximum 100 wt. % implies the case of the whole warm mix additive without any elastic material.

Manufacturing of crack-resistant warm mix additives by adding elastic materials is suggested first time in this invention. FIG. 3 exhibits visco-elastic property of a Sasobit wax made by the Fisher-Tropsch method and used widely as a warm mix additive in the world. After a warm mix asphalt specimen is made by resolving 2 wt. % Sasobit into an 98 wt. % asphalt binder, this specimen is used to measure its storage modulus, loss modulus and phase angle (delta) in the temperature range of 40 to 80° C. by using the dynamic shear rheometer (DSR). These three properties are applied to compute its dynamic shear modulus and three visco-elastic properties (i.e., sine (delta), cosine (delta) and tangent (delta)) at measured temperatures. Here, sine (delta) is used to represent the visco-elastic property of the warm mix asphalt specimen because either of three properties represents the same visco-elasticity of a given specimen. The value of sine (delta) has usually 0.3-1.0 according to content of elasticity contained. The sine (delta)=1 represents a completely viscous property, and the lesser sine (delta) from one implies the more elastic property contained with correspondingly decreased viscous property. Note that all visco-elastic fluids show tendency of sine (delta) to approach to one when temperature rises to the high enough, while the elastic property of visco-elastic fluids increases when temperature decreases, that is, sine (delta)<1.

In FIG. 3, the sine (delta) of the warm mix asphalt including the 3 wt. % sasobit wax is compared with the one additionally added with the 3 wt. % of the elastic material (R). The latter demonstrates the smaller sine (delta) (that is, more elastic property) throughout all temperatures studied compared to the former. At the lowest temperature (40° C.), the difference of sine (delta) is enlarged and at the highest (80° C.), both approach to one showing almost no difference. When cracks of asphalt pavements are considered to take place relatively easily at low temperature due to material contraction, the fact that sin(delta) of the warm mix additive deceases (or elasticity increases) with low temperature indicates elevation of pavement crack resistance. In FIG. 3 where the lowest temperature is 40° C., sine (delta) difference between the former and the latter becomes even large when temperature decreases less than 40° C. This reminds that the crack-resistant warm mix additive containing the elastic material will increase crack resistance of asphalt pavements at low temperatures and can prevent the local pavement cracks.

In FIG. 4, measured sine (delta) values of an asphalt binder (I), an asphalt binder including 3 wt. % R (an elastic material) (II), an asphalt binder containing 3 wt. % R and 0.8 wt. % CM (a warm mix additive) (III), and finally an asphalt binder containing 3 wt. % R and 2 wt. % CM (IV) are displayed with respect to a temperature change of 40-80° C. As same as FIG. 3, difference of sin(delta) for each case is clearly manifested with decrease of temperature, but becomes none at the high temperature of 80° C. (all approaching to sin(delta)=1, a totally viscous fluid). II shows a further better elastic property than I, but III with presence of 0.8% CM (warm mix additive) demonstrates even better crack resistance than II with no CM. It is noted that III and IV show no difference between the two. This means that a small amount of CM is enough.

In FIG. 5, measured sin(delta) values of an asphalt binder (I), an asphalt binder including 3 wt % R (an elastic material) (II), and an asphalt binder containing 3 wt. % R and 0.8 wt. % combined warm mix additive (0.6 wt. % CM plus 0.2 wt. % HCO) (III) are displayed with respect to a temperature range of 40-80° C. Sin(delta) values in FIG. 5 demonstrate the similar trends shown in FIGS. 3 and 4, but using 0.8 wt. % combined warm mix additive (0.6 wt. % CM plus 0.2 wt % HCO) results to better elastic effect (less sin(delta)) instead of using 0.8 wt. % single warm mix additive (CM).

Crack-resistant warm mix additives studied above can draw the following conclusions; first, combined warm mix additive turns out to be better warm mix effect compared to the single one; second, if an elastic material is added to a warm mix additive, the crack-resistant effect at low temperatures can be improved considerably; and, third, even for crack-resistance effect, combined warm mix additives are better than using single ones.

The elastic materials added in making the crack-resistant warm mix additives of this invention are identical to the highly elastic polymers mentioned previously, but the only difference between the two is to use relatively small amount in the crack-resistant additive. These highly elastic polymers are characterized to include more than one among SBS (styrene-butadiene-styrene), SBR (styrene-butadiene-rubber), SBR latex, SIS (styrene-isoprene-styrene), SEBS (styrene-ethylene-butadiene-styrene), crum rubber (powdered waste tire), waste rubber powder, natural rubber powder, liquid natural rubber, EPDM (ethylene-propylene-diem) powder, MMA (methyl-met-acrylate) resin, PU (polyurethane) powder and other highly elastic materials.

Now, let us investigate the manufacturing method of highly visco-elastic warm-mix modifiers. Shapes of highly visco-elastic warm-mix modifiers can be pellet, film, thin plate, sheet, bottle, wire-coating, short fiber, waste scrap, powder, or mixtures of these shapes. Their material state is new, regenerated, waste, or mixtures of these. Wastes are favored over others for prevention of environmental pollution, waste recycling, and economic advantage. There are three manufacturing methods that are introduced below and one of them can be selected for manufacturing.

First, the compositional elements of the highly visco-elastic warm-mix modifier described above are put into a banbury mixer (or kneader), and then are heated, melted and well mixed to make a uniform melt. This melt goes through an extruder to make several melt strands that are cooled and cut into solid pellets. These pellets are further made into fine particles or powders by crushers or pulverizers to be final products. This method is used in manufacturing the most uniform highly visco-elastic warm-mix modifiers.

Second, the compositional elements of the highly visco-elastic warm-mix modifier described above are put directly into the extruder without going through a banbury mixer (or kneader). The next procedures after the extrusion are exactly same as the first. The second method is better than the first in the view of less equipment purchase or reduced production process.

Third, after each compositional element of the highly visco-elastic warm-mix modifier is made into fine particles or powders separately at an ambient temperature by using crushers or pulverizers, each element is physically mixed. This is the simplest and cheapest method of manufacturing, but it has a weak point of being locally non-uniform in each element of the composition. This non-uniformity does not make any problem to be used as the highly visco-elastic warm-mix modifier in the view of the overall material property.

This invention is characterized to constitute the composition of the virgin or the regenerated highly visco-elastic warm mix asphalt concrete mixture by combining 0.5-20 weight parts of a highly visco-elastic warm-mix modifier, 10-100 weight parts of an asphalt binder, 850-987.5 weight parts of aggregates, 2-50 parts of a filler, and, if necessary, a small amount of anti-stripping agent and anti-oxidant. The virgin or the regenerated highly visco-elastic warm mix asphalt concrete mixture is characteristically produced by heating this composition at 80-180° C. and mixing them in the mixer of an asphalt concrete production plant.

In the above asphalt concrete mix composition, the using range of the highly visco-elastic warm-mix modifier is 0.5-20 weight parts. Here, the 0.5 weight part is the minimum amount for manifestation of modifier's effect and being more than the 20 weight part makes production very difficult due to extremely high viscosity. Thus the usage is limited in the range of 0.5-20 weight parts.

In the above composition, the using range of an asphalt binder is 10-100 weight parts. Here, the 10 weight part is the minimum amount of asphalt binders to produce the pavement base-layer material by using 100% reclaimed asphalt pavement (RAP) aggregates, and the maximum 100 weight parts implies asphalt binders required to produce the asphalt mastic. But most of highly visco-elastic warm-mix modified asphalt concrete mixtures use asphalt binders in the range of 10-100 weight parts.

In the composition above, aggregates mean all virgin or all RAP or mixed aggregates of virgin and RAP. Especially, when RAP recycling is demanded a lot in the paving industry for environmental and economic aspect, necessity of RAP-recycled asphalt pavements by using the RAP aggregate is ever increasing. To describe usage of both virgin and RAP aggregates together, the aggregate is composed of 100% by adding the less than 100% virgin aggregates to the less than 100% RAP. The 100% virgin aggregate indicates the one for the 100% virgin highly visco-elastic warm-mix modified asphalt concrete mixtures, the 100% RAP aggregate does the one for the 100% RAP-recycled highly visco-elastic warm-mix modified asphalt concrete mixtures, and the sum of 100% by adding the virgin aggregate % to the RAP aggregate % does the one for the partially RAP-recycled highly visco-elastic warm-mix modified asphalt concrete mixtures. The aggregate distribution becomes from the maximum size of 53 mm to the minimum of 0.001 mm. This size distribution is characterized to consider usage of the 19-53 mm size for most of the base and the intermediate layer, and usage of the less than 19 mm size for most of the surface, the wearing and the mastic layer. For an example, the surface layer aggregate distribution for the less than 19 mm can include all grades like dense, rut-resistant, mastic, low-noise porous, bridge surface, SMA (surface matrix aggregate), airport taxi-layer, superpave, gap and an arbitrary grade by a designer. In the composition above, the 850-987.5 aggregate weight part represents solely the aggregate part only out of total 1000 weight parts by excluding all other constituents.

Under hot summer temperatures, viscosity of the general and the modified asphalt binder coated on aggregates near pavement surfaces becomes softened, and binders slowly flow downward into vacant spaces by relaxation. The more does viscosity of binders weakened make the faster does the rate of vacancy filling accomplished with fast relaxation speed. As the result, aggregate separation or segregation from the pavement surface can easily takes place due to thinner coating thickness of aggregates on the surface. To prevent the binder relaxation phenomenon by increasing viscosity, filler is added to asphalt binders. When the proper amount of filler is added to a binder, it strengthens asphalt pavements to promote stiffness and crack resistance that reduce rutting and fatigue cracking. Especially, filler is a key material for porous asphalt pavements because it contributes to maintain the original air void not to be collapsed.

In the above composition, a filler is characterized to include aggregate powder, limestone powder, furnace slag powder, cellulose fiber, glass fiber, polymer fiber (i.e., polyethylene (PE) fiber, polypropylene (PP) fiber, nylon fiber, etc.), carbon black, fly ash, glass fiber, clay powder, calcium carbonate powder, caustic soda, lime soda, cement, steel-making powder and other fillers. Effect of these fillers can be ignored under 2 weight parts, and, above 50 weight parts, asphalt binder viscosity is increased too much such that production and construction are very difficult to do. Also, stiffness of an asphalt mixture itself increases too much to cause acceleration of pavement cracks by adding excessive fillers. That is why filler use is limited to within 2-50 weight parts.

To construct the highly visco-elastic warm-mix modified asphalt pavement, the corresponding asphalt concrete mixture (the highly visco-elastic warm-mix ASCON) claimed above must be produced. Two methods of production exist and either one can be chosen.

First, after the 0.5-20 weight-part highly visco-elastic warm-mix modifier in the form of fine powder (or particle) and the 10-100 weight part asphalt binder, both, are entered into the liquid mixing tank, then make processing of heating and mixing and passing through the colloid-mill allow manufacturing of the highly visco-elastic warm-mix asphalt binder in the form of the uniform liquid. This liquid binder is transported to the asphalt mixing plant and is stored in the modified asphalt storage tank. This liquid binder is pumped and sprayed into aggregates and fillers already entered in the mixer of the asphalt plant. When all mix together there at the warm-mix temperature, the highly visco-elastic warm-mix modified asphalt concrete mixture can be produced. This production method is called the pre-mix type.

Second, vinyl-film bags containing a specified amount of the highly visco-elastic warm-mix modifier in the form of fine powder (or particle) are transported to the asphalt plant, and the designed number of bags is dropped into the mixer of the plant already containing specified amount of aggregates and fillers. They are mixed under the warm-mix temperature by spraying the general asphalt binders to produce the highly visco-elastic warm-mix modified asphalt concrete mixture. This production method is called the plant-mix type.

The pre-mix production method is to mix asphalt binders and highly visco-elastic warm-mix modifiers in advance to manufacture the uniform highly visco-elastic warm-mix liquid asphalt binders. These are brought to the asphalt plant to spray on aggregates and fillers for production of the corresponding modified warm mix asphalt. Meanwhile, the plant-mix method is to insert asphalt binders, specified amount of highly visco-elastic warm-mix modifiers, aggregates and fillers separately in the mixer of the asphalt plant and mix them well at the warm-mix temperature to produce the corresponding modified warm mix asphalt (WMA). Because both methods are to produce the same modified warm mix asphalt (WMA), either method can be used.

The highly visco-elastic warm mix modifier constituted by the above composition can be applied to construct diverse asphalt pavements; in examples, the low-noisy modified warm-mix porous asphalt pavement using the low-noisy porous aggregates; the surface and the base layer of the modified warm-mix general asphalt pavements using the dense-graded or the superpave aggregates; the modified warm-mix RAP-recycled asphalt pavement using mixed aggregates of RAP and virgin or only RAP aggregates; the modified warm-mix bridge surface pavement using the bridge surface aggregates; the modified warm-mix SMA asphalt pavement using the SMA aggregates; the modified warm-mix airport-taxiway asphalt pavement using the airport-taxiway aggregates. The very modifier takes a key role in improving functionality, performance, life-cycle of each pavement mentioned above.

Effects of Invention

Use of the highly visco-elastic warm-mix modifier manufactured by mixing the highly elastic polymers, the viscous ones and the crack-resistant warm-mix agents in the appropriate rate can make production of all kinds of modified asphalt concrete mixtures at a warm mix temperature that allow to construct the durable modified asphalt pavements. Production and construction of these pavements in this invention have advantages of air-pollution reduction, saving of fuel consumption, lowering of material oxidative aging, shortening of traffic opening time as the result of warm-mix effect, and also improvement of pavement performance properties and extension of pavement life cycle as the result of increased visco-elasticity of asphalt binders.

Asphalt pavements mentioned above are indicated to be the surface, the intermediate, the base layers of modified asphalt pavements to be paved on the general traffic, the low-noisy porous, the RAP-recycled, the cold and the hot regional, the bridge surface and the SMA roadways, classified as pavement functionality, and major highways, urban and suburban traffic roads, industrial heavy traffic roads, local highways, airport taxiways classified as pavement usage. The environment-friendly modified warm-mix asphalt pavement will also provide reduction of pavement maintenance cost due to the pavement life-cycle extension.

BRIEF EXPLANATION OF FIGURES

FIG. 1: I-Temperature reductions of single & combined warm-mix additives.

FIG. 2: II-Temperature reductions of single & combined warm-mix additives.

FIG. 3: Elastic effect of the Sasobit-wax containing an elastic material (R).

FIG. 4: Elastic effect of a single warm-mix additive (CM) containing an elastic material (R).

FIG. 5: Elastic effect of a combined warm-mix additive (CM+HCO) containing an elastic material (R).

EXAMPLES FOR BEST PRACTICES OF INVENTION

Compositions of highly visco-elastic warm-mix modifiers for the practice (1, 2, 3) and the comparison (1, 2, 3) are listed in Table 1. Each modifier shown in Table 1 is well mixed with a given amount of an asphalt binder at 180° C. for 2 hours to produce a homogeneous modified asphalt binder. Penetration tests are performed at 25° C. for these modified asphalt binders and the measured results are displayed in Table 1. For physical property measurement of the highly visco-elastic warm-mix modified asphalt concrete mixtures, 955 kg of 19 mm dense-graded aggregates (30 wt % RAP+70 wt % virgin aggregate), 35 kg of an asphalt binder (AC-20), 4 kg of a filler (limestone powder), and 6 kg of each modifier in the practice and those in the comparison are uniformly mixed at 140° C. in the Marshall mixer. Each modified mixture-specimen is made by inserting each concrete mixture into the Marshall mold and compacting both sides in the mold applying 75 Marshall strokes. After each specimen is cured for one day at the room temperature, it is released from the mold. Marshall stability tests are performed for each specimen by following the testing specification and the results are included in Table 1.

Table 1 shows that the penetration value of visco-elastic warm-mix modified asphalt binders and the Marshall Stability of its asphalt concrete mixture in the practice (of this invention) are turned out to be further better, compared to those values of a general asphalt binder or other modified asphalt concrete mixtures in the comparison.

TABLE 1

| | Test Compositions | Penetration (100 g, 5 s, 25° C.) | Marshall Stability (kg, 60° C.) | Flow Value (0.1 mm, 60° C.) |
|---|---|---|---|---|
| Practice | 1 Polyester-LDPE film composite + crumb rubber + LDPE + aromatic processing oil | 45 | 2100 | 42 |
| | 2 Nylon + rubber powder + carbon black + aromatic processing oil | 43 | 2300 | 44 |
| | 3 PET-LDPE film composite + SBR latex + LDPE | 48 | 1850 | 43 |
| Comparison | 1 A general asphalt binder | 78 | 1050 | 36 |
| | 2 SBS modified asphalt binder | 62 | 1450 | 42 |
| | 3 Gilsonite + crumb rubber + HDPE | 54 | 1650 | 32 |

I claim:

1. A highly viscoelastic, warm-mix modifier for asphalt pavements, including recycled asphalt pavements, the highly viscoelastic, warm-mix modifier comprising:
   a highly viscoelastic modifier comprising:
      at least 10% and not more than 90% by weight of a viscous polymer component comprising:
         a highly viscous polymer selected from the group consisting of polyethylene-terephthalate (PET) and nylon;
         and
         a medium viscous polymer; and
      at least 10% and not more than 90% by weight of a highly elastic polymer component; and
      not more than 100% of a warm-mix additive component comprising at least one warm mix additive; and
   a reaction agent component, wherein the reaction agent is selected from the group consisting of maleic anhydride, benzoyl peroxide, acetaldehyde, and platinum catalyst, and
wherein the highly viscoelastic, warm-mix modifier is a powder at an ambient temperature.

2. The highly viscoelastic, warm-mix modifier of claim 1, the medium viscous polymer being selected from the group consisting of: low density polyethylene (LDPE), linear low-density polyethylene (LLDPE), high density polyethylene (HDPE), polyvinyl-acetate (PVA), ethylene-vinyl-acetate (EVA) copolymer, and polybutene.

3. The highly viscoelastic, warm-mix modifier of claim 1, the highly elastic polymer component being selected from the group consisting of: styrene-butadiene-styrene (SBS), styrene-butadiene rubber (SBR), SBR latex, styrene-isobutylene-styrene (SIS), styrene-ethylene-butadiene-styrene (SEBS), crumb rubber, waste rubber powder, natural rubber powder, and liquid natural rubber.

4. The highly viscoelastic, warm-mix modifier of claim 1, the warm-mix additive component being selected from the group consisting of: 12-hydroxy stearic acid, hydrogenated castor oil, petroleum resin, pine wax, ethylene-vinyl-acetate (EVA) copolymer wax, polyethylene (PE) wax, polyamide wax, maleic PE wax, ethylene-vinyl-acetate (EVA) emulsion, acryl emulsion, styrene-butadiene-rubber (SBR) emulsion, aromatic process oil, aliphatic process oil, mixed processing oil of aromatic and aliphatic oils, cutback asphalt, heavy oils, A, B & C bunker oil, asphalt emulsion, industrial oils, plant oils, and animal oils.

5. A warm-mix modified asphalt concrete mixture including a modified recycled asphalt concrete mixture comprising 0.5-20 parts by weight (pbw) of the highly viscoelastic warm-mix modifier of claim 1 per 1000-1020 pbw of a warm mix modified asphalt concrete mixture.

6. A warm-mix modified asphalt concrete mixture including a modified recycled asphalt concrete mixture comprising 0.5-20 parts by weight (pbw) of the highly viscoelastic warm-mix modifier of claim 2 per 1000-1020 pbw of a warm mix modified asphalt concrete mixture.

7. A warm-mix modified asphalt concrete mixture including a modified recycled asphalt concrete mixture comprising 0.5-20 parts by weight (pbw) of the highly viscoelastic, warm-mix modifier of claim 3 per 1000-1020 pbw of a warm mix modified asphalt concrete mixture.

8. A warm-mix modified asphalt concrete mixture including a modified recycled asphalt concrete mixture comprising 0.5-20 parts by weight (pbw) of the highly viscoelastic, warm-mix modifier of claim 4 per 1000-1020 pbw of a warm mix modified asphalt concrete mixture.

9. The highly viscoelastic, warm-mix modifier of claim 1, wherein all components of the highly viscoelastic, warm-mix modifier are heated, melted and well mixed to make a uniform melt which is sent through an extruder and cooled and cut to make solid pellets which are further made into fine particles or powders.

10. A warm-mix modified asphalt concrete mixture including a modified recycled asphalt concrete mixture comprising 0.5-20 pbw the highly viscoelastic, warm-mix modifier of claim 9 per 1000-1020 pbw of a warm-mix modified asphalt concrete mixture.

11. A warm-mix modified asphalt concrete mixture as in claim 10 further containing 2-50 pbw of fillers per 1000-1020 pbw of a warm-mix modified asphalt concrete mixture.

12. A warm-mix modified asphalt concrete mixture as in claim 11 wherein the at least one filler being selected from the group consisting of aggregate powder, limestone powder, furnace slag powder, cellulose fiber, glass fiber, polymer fiber, carbon black, fly ash, glass fiber, clay powder, calcium carbonate powder, cement, and steel-making powder.

* * * * *